United States Patent Office 3,280,224
Patented Oct. 18, 1966

3,280,224
O,O-DIALKYL S-ALKYL ESTERS OF PENTA-VALENT THIOPYROPHOSPHORUS ACIDS
Thomas Mason Melton, Richmond, Va., assignor to Socony Mobil Oil Company, Inc., a corporation of New York
No Drawing. Filed Sept. 16, 1963, Ser. No. 309,278
9 Claims. (Cl. 260—933)

This invention relates to and has for its object new insecticidal compositions. Specifically, the present invention concerns compounds of the formula

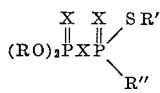

wherein R is an alkyl of from 1 to 8 carbon atoms, R' and R" are alkyls of from 1 to 4 carbon atoms, and X is oxygen or sulfur.

PREPARATION OF THE COMPOUNDS, GENERALLY

Two compounds of the invention may be obtained by reacting one of the compounds from the general class represented by

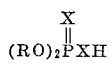

with a compound from the general class designated by

in the presence of an organic amine free of active hydrogen, substantially according to the following scheme:

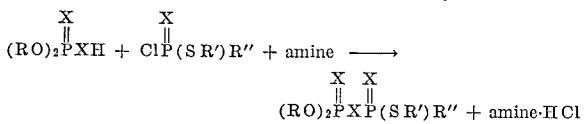

R, R', R", and X have the same meanings as above.

Alternately the compounds may be prepared in a similar manner by employing a salt of the appropriate acid. Various salt forming ions, such as sodium, potassium or lithium may be used, but for the purposes of the present invention, the ammonium ion is preferred. This particular method may be shown as follows

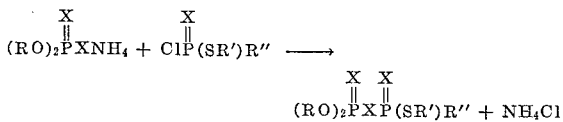

Again, R, R', R", and X are the same as above-defined.

Generally, solvents are not essential, but they are desirable whenever it is necessary to expel heat or to keep large amounts of solids from interfering with reaction rate or efficiency of stirring. When solvents are used, any inert member will be suitable provided starting materials and product are substantially soluble therein, and provided further that its boiling point is not sufficiently high to prevent easy separation of the product therefrom. Examples of preferred solvents are acetone, hexane and methylethyl ketone.

UTILITY AND FORMULATIONS

As stated previously, the compounds of this invention are insecticides. As used herein, the term "insecticides" will be understood to encompass the use of the claimed chemicals against spiders, mites, ticks, and similar pests which are not, biologically speaking, insects.

The new compounds are effective as insecticides within the range of about 0.01% to about 0.3% of the total weight of formulation used. It is contemplated, however, that under ideal conditions the amount may be less than the lowest stated rate. Furthermore, while 0.3% will generally be adequate for complete control, it may be that certain conditions, such as adverse weather, resistance of the pest and the like, will require a higher rate of application. This range, therefore, is not to be controlling, since it is merely a statement of the preferred range.

The compounds may be used as the sole agent in insecticidal formulations, or they may be used in conjunction with other toxicants. They may be made into insecticidal compositions by diluting with solid carriers such as fertilizers, talc, bentonite, attapulgite and the like, by dispersing in an organic solvent, or in water, or in a combination of water and solvent. The organic solvent used is preferably one which will evaporate quickly from any plants which are to be treated, or if not volatile, will not be phytotoxic to the plant. The aqueous dispersions may contain a surface active agent such as Tween–20 (polyoxyethylene sorbitan monolaurate), which will have the advantages of providing emulsification and of aiding in spreading the active material more uniformly over the plant surface.

In using the chemicals of this invention against agricultural pests the aqueous dispersion or solution will ordinarily be made up from a concentrate composed substantially of the compound and at least about 1%, based upon the weight of the active ingredient, of the surface active agent. The concentrate will be dispersed in water, or in water containing an inert organic solvent, to the extent necessary to give the desired concentration of active ingredient.

Solid formulations may be prepared by mixing the active ingredient and a granular or finely divided solid in such proportions as to give the desired concentration. Since, however, the active component is used in such small quantities, a formulation containing a more uniformly distributed active component can be obtained by (1) dissolving the desired quantity of compound in acetone or other solvent which can be readily evaporated, (2) mixing the solid with the solvent-active ingredient mixture and then (3) evaporating the solvent.

SPECIFIC ILLUSTRATIONS

The following examples will illustrate the preparation of the compounds of this invention. "Parts" are parts by weight unless otherwise stated.

Example 1

Preparation of S-(O,O-diethyl phosphorothioyl) S-propyl methylphosphonotrithioate.

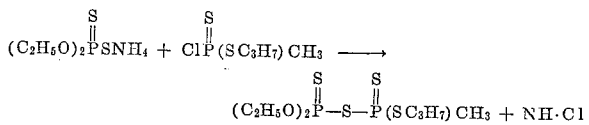

Ten and two-tenths parts of ammonium O,O-diethyl phosphorodithioate and 59 parts of acetone were placed in a suitable reaction vessel. 9.4 parts of S-propyl methylphosphonochloridodithioate was added to this mixture at room temperature. No reaction occurred. The mixture was thereupon heated to the refluxing temperature of the solvent, and was maintained there, while stirring, for four hours. The mixture was cooled, the ammonium chloride was removed by filtration, and the acetone was distilled away from the product in vacuo. Essentially theoretical yield of the product was obtained. Distillation of a portion of the crude material gave a fraction having the following properties:
Refractive index at 25.5° C.—1.5748.
Density at 20°/4° C.—1.212.

Example 2

Preparation of O-(O,O-dibutyl phosphoryl) S-propyl methylphosphonodithioate.

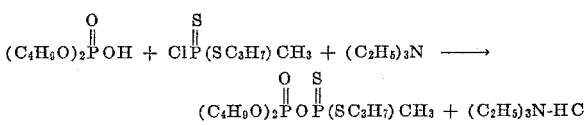

Twenty-one parts of dibutyl phosphate, about 50 parts of hexane, and 10.1 parts of triethylamine were placed in a suitable reaction vessel. To the mixture in the vessel was added 18.1 parts of S-propyl methylphosphonochloridodithioate in four minutes at 25° C. The mixture was heated at reflux for two hours, and was then cooled. The amine hydrochloride was removed by filtration, and the hexane was evaporated, first at atmospheric pressure, and finally to 100° C. at 30 mm. of Hg. A quantitative yield of product was obtained having the following properties:

Refractive index at 28.5° C.—1.4876.
Density at 20°/4° C.—1.101.
Saponification equivalent: Calc., 181.2; found, 185.0.

Example 3

Preparation of O-[O,O-bis(2-ethylhexyl)phosphoryl] S-propyl methylphosphonodithioate.

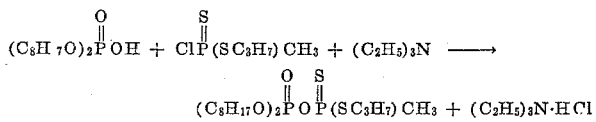

Thirty-two and two-tenths parts of bis(2-ethylhexyl) phosphate, 10.1 parts of triethylamine and 18.1 parts of S-propyl methylphosphonochloridodithioate in hexane were reacted together essentially as shown in Example 2. A quantitative yield of product was obtained. Following are its properties:

Refractive index at 28.5° C.—1.4815.
Density at 20°/4° C.—1.043.

The compounds of the following examples may be prepared similarly to those of Examples 1 to 3.

Example 4

O-(O,O-dimethyl phosphoryl) S-propyl ethylphosphonodithioate of the formula

from

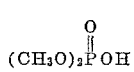

or its salt, and

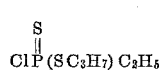

Example 5

S-(O,O-dipropyl phosphorothioyl) S-methyl butylphosphonotrithioate of the formula

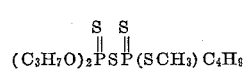

from

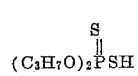

or its salt, and

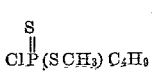

Example 6

O-(O,O-dibutyl phosphoryl) S-ethyl butylphosphonothioate of the formula

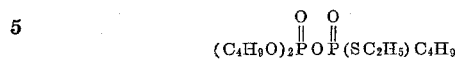

from

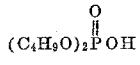

or its salt, and

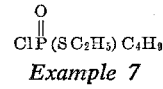

Example 7

S-(O,O-diamyl phosphoryl) S-propyl propylphosphonodithioate of the formula

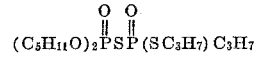

from

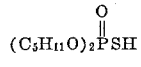

or its salt, and

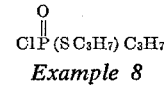

Example 8

O-(O,O-dihexyl phosphoryl) S-butyl ethylphosphonothioate of the formula

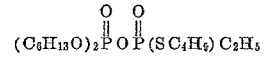

from

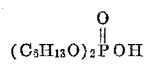

or its salt, and

What is claimed is:
1. A compound of the formula

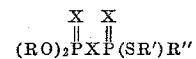

wherein R is an alkyl of from 1 to 8 carbon atoms, R' and R" are alkyls of from 1 to 4 carbon atoms, and X is a member of the group consisting of oxygen and sulfur.

2.

3.

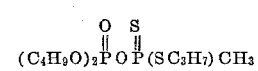

4.

5.

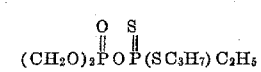

6.

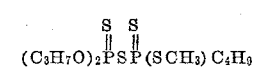

7.
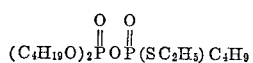
8.
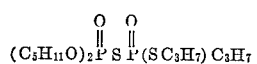
9.
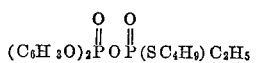
No references cited.
CHARLES B. PARKER, *Primary Examiner.*
FRANK M. SIKORA, *Assistant Examiner.*

UNITED STATES PATENT OFFICE
CERTIFICATE OF CORRECTION

Patent No. 3,280,224                        October 18, 1966

Thomas Mason Melton

It is hereby certified that error appears in the above numbered patent requiring correction and that the said Letters Patent should read as corrected below.

Column 2, line 57, for "NH.Cl" read -- $NH_4Cl$ --; column 3, line 8, for "$(C_2H_5)_3N.HC$" read -- $(C_2H_5)_3N.HCl$ --; column 5, lines 1 to 4, for "$(C_4H_{19}O)_2\overset{O}{\overset{\|}{P}}O\overset{O}{\overset{\|}{P}}(SC_2H_5)C_4H_9$" read -- $(C_4H_9O)_2\overset{O}{\overset{\|}{P}}O\overset{O}{\overset{\|}{P}}(SC_2H_5)C_4H_9$ --; column 6, lines 2 to 4, for "$(C_6H_3O)_2\overset{O}{\overset{\|}{P}}O\overset{O}{\overset{\|}{P}}(SC_4H_9)C_2H_5$" read -- $(C_6H_{13}O)_2\overset{O}{\overset{\|}{P}}O\overset{O}{\overset{\|}{P}}(SC_4H_9)C_2H_5$ --.

Signed and sealed this 5th day of September 1967.

(SEAL)
Attest:

ERNEST W. SWIDER                             EDWARD J. BRENNER
Attesting Officer                           Commissioner of Patents